March 20, 1962  E. H. BRAUN  3,025,751
METHOD FOR CONTROLLING THE SPEED OF
A MOTION PICTURE PROJECTOR
Filed Jan. 5, 1959  2 Sheets-Sheet 1

3,025,751
METHOD FOR CONTROLLING THE SPEED OF A MOTION PICTURE PROJECTOR
Edward H. Braun, 2718 Terrace Road SE., Washington, D.C.
Filed Jan. 5, 1959, Ser. No. 784,942
1 Claim. (Cl. 88—16.2)

This invention relates principally to sound motion pictures, and more particularly to a method and apparatus whereby a motion picture projector and a magnetic tape recorder may be held in step so as to project perfectly lip-synchronized sound motion pictures.

The invention has a number of advantages over the existing art, the foremost being that amateur photographers may quite easily and inexpensively convert their present silent motion picture equipment in accordance with the invention so that they may project lip-synchronous sound motion pictures. However, the invention is not restricted to the modification of existing equipment, but may also be easily incorporated in new equipment.

The invention may be better understood by reference to FIGS. 1 through 4, in which.

Figure 1:
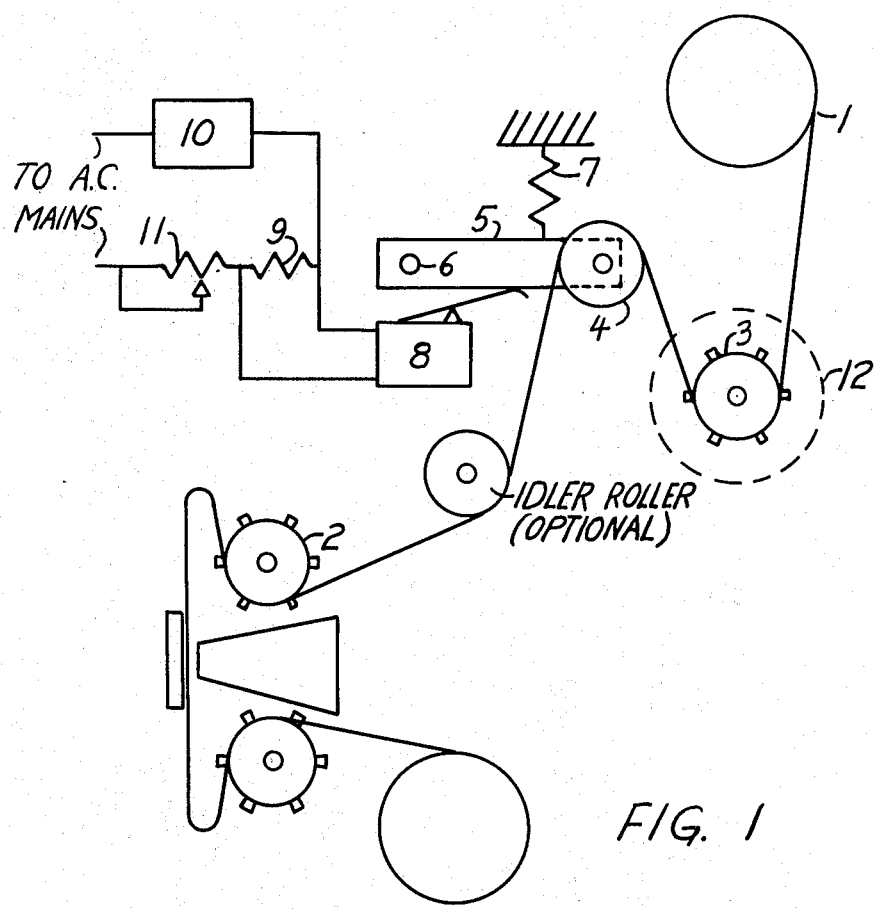
FIG. 1 is a diagrammatic view showing a motion picture projector together with additional apparatus which controls the speed of the projector in accordance with the invention.

In general terms, the invention operates as follows. Referring to FIG. 1, a roll of motion picture film 1 which is to be projected is threaded into a standard motion picture projector. At some point in the film path, for example between the feed reel 1 and the first (or feed) sprocket 2, an auxiliary sprocket 3 is introduced, and the film is also threaded over this sprocket. This auxiliary sprocket is driven independently at a certain rate by means to be discussed below. (It is understood that the usual clamp or other means is also present to hold the film in contact with the auxiliary sprocket 3 so as to prevent any slippage of the film over the sprocket. The term "sprocket" as used herein refers to any device over which the film moves at the same linear speed as a point on its periphery, i.e., motion without slipping.)

If, now, the projector is started up while the auxiliary sprocket 3 is driven separately at said certain rate, the tension in the film located between the auxiliary sprocket 3 and the projector feed sprocket 2 will depend on the relative speed of the two sprockets. Thus, if the projector is driving the film at a rate faster than that at which it is being supplied by the auxiliary sprocket, the tension in the film will increase, whereas if the projector is driving the film at a slower rate than that at which it is being supplied by the auxiliary sprocket, the tension in the film will decrease.

If, now, means are provided to sense the amount of tension in the film between the auxiliary sprocket 3 and the projector feed sprocket 2, and if the speed of the projector is varied by a device responsive to the sensing means, then the average speed of the projector may be made to correspond to the average speed of the auxiliary sprocket.

One means of sensing the tension in the film and controlling the speed of the projector is shown in FIG. 1. The film is passed over the roller 4 mounted on the arm 5 which in turn is free to rotate about the pivot 6. The arm 5 is normally held up by the tension in the spring 7, and is positioned above the normally closed microswitch 8. The projector speed is adjusted to drive the film at a slightly faster rate than the auxiliary sprocket 3, and therefore the tension in the film located between the auxiliary sprocket 3 and the projector feed sprocket 2 will increase. The pressure of the film on the roller 4 will then pull down the arm 5 and activate the microswitch 8. Since the microswitch 8 is normally closed, this activation opens it and removes the shunt from the resistor 9. Since this resistor 9 is in series with the regular projector drive motor 10, and (if one is used) the projector speed control rheostat 11, the net result of depressing the microswitch is to throw more resistance in series with the projector motor 10 and thereby slow it down. The value of the resistor 9 is adjusted so that the projector drives the film at a rate slightly below the speed of the auxiliary sprocket 3 when the resistance is in the circuit.

As soon as the projector slows down, the tension in the film decreases, and the pressure on the roller 4 is reduced. The restoring spring 7 then pulls upwards on the arm 5 and raises the arm to its original position. Simultaneously the microswitch 8 returns to its original normally closed position. This again shunts the resistor 9, and the projector speeds up, thereby starting the cycle all over again. (Instead of using a separate restoring spring 7, the normal spring action of the microswitch may be used to hold the arm 5 in the "up" position.)

Thus, the speed of the projector is made to oscillate so that the projector drives the film alternately above and below the speed of the auxiliary sprocket 3. Over a period of time, the average speed of the projector will obviously equal the average speed of the auxiliary sprocket. Furthermore, the magnitude of the oscillations may be kept quite low, since the movement required in the arm 5 is quite small. Hence the film will never vary more than a frame or so from the position it would have if the projector were driven in exact synchronism with the auxiliary sprocket.

Turning now to the drive mechanism for the auxiliary sprocket 3, this may either be of a type which drives the sprocket continuously or intermittently. For projecting lip-synchronous sound motion pictures where the sound is recorded on magnetic tape, it is desirable to drive the auxiliary sprocket 3 in such a way that tape and film synchronize perfectly. One method well known to the art for synchronizing tape and film is to record a control signal (say a 60 cyce per second sine wave, or a series of pulses) along with the audio signal on the tape and to use this signal to control the speed of the motion picture film on playback. This method may be used with the present invention.

As an example of the continuous type drive, a small synchronous motor 12 may be used to drive the auxiliary sprocket 3. This motor may be powered at the frequency of the control track read off the tape. The motor may be a very small unit of the clock type consuming only a few watts of power, since (in the embodiment of the invention shown in FIG. 1) it only has to have enough torque to pull the film off the supply reel.

Since the synchronous motor 12 requires so little power, this is best supplied by direct amplification of the control track on the tape. However, the motor could also be driven by other means such as an inverter which is synchronized to the frequency of the control track on the tape.

Figure 2:
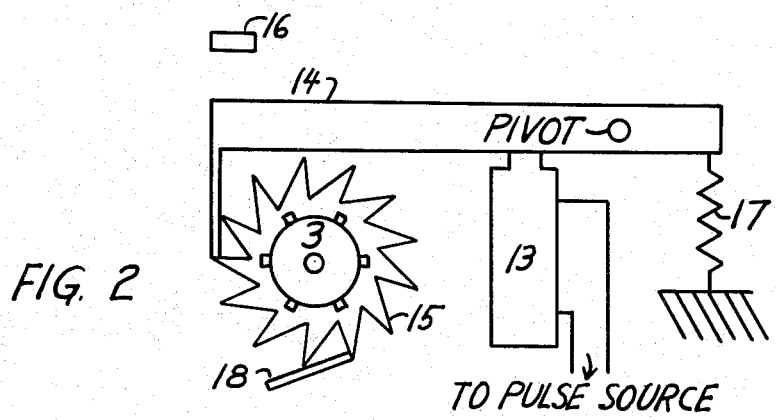
FIG. 2 is a diagrammatic view of a ratchet arrangement which drives an auxiliary sprocket used with the invention.

An example of the intermittent type drive for the auxiliary sprocket is a ratchet which is activated by pulses which may be derived from the tape. Referring to FIG. 2, when the magnet coil 13 is activated by a pulse from the tape, it pulls down the arm 14 and rotates the ratchet wheel 15 which in turn drives the sprocket 3 which is mounted on the same shaft, or geared thereto. Upon removal of the pulse, the spring 17 returns the arm 14 to its original position against the stop 16 and prepares it for the next pulse. The portion of the arm 14 which strikes the ratchet wheel 15 may be made of spring steel or be spring loaded so that it will clear the ratchet wheel when being reset. A pawl 18 prevents backward motion of the sprocket.

The methods just described for driving the auxiliary sprocket in synchronism with a signal recorded on the tape result in absolutely perfect synchronism between the tape and film. An exactly synchronous start may be obtained by having a blank leader on the tape before the point where the control signal commences. The tape recorder is started up, and when the control signal commences this starts the auxiliary sprocket 3 into motion. The projector mechanism is then immediately started up by the operator, and a perfectly synchronous start is assured.

Figure 3:
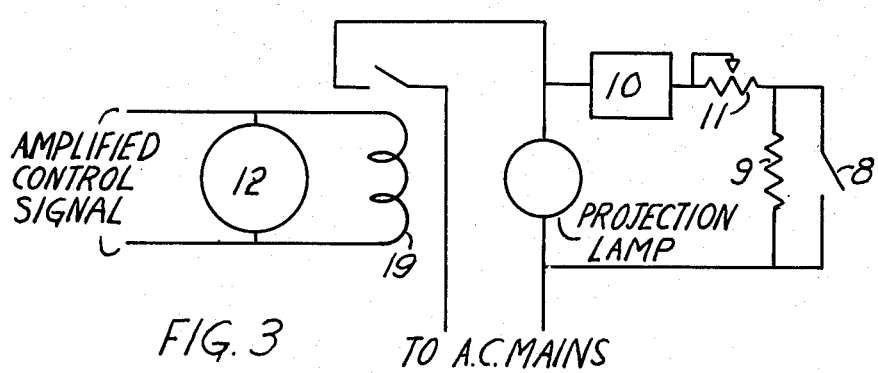
FIG. 3 is a circuit diagram showing a method for automatically starting a motion picture projector at the same time as the auxiliary sprocket.

Or the projector may also be started up automatically by means of a relay. Referring to FIG. 3, the amplified control signal, in addition to being applied to the synchronous motor (or ratchet assembly) 12 which drives the auxiliary sprocket, is also applied to the relay 19. When the control track commences, the synchronous motor or ratchet) 12 starts up and the relay 19 closes, thereby completing the projector motor and lamp circuit and starting the projector drive mechanism into motion.

It should be emphasized that the exact instant at which the projector mechanism is started is immaterial, since once the auxiliary sprocket starts up, the projector will come into perfect synchronization automatically.

It is desirable to use a type of synchronous motor (or ratchet) to drive the auxiliary sprocket which does not require excessive torque to be rotated by the film at a speed in excess of synchronous speed when the synchronous motor (or ratchet) is running, and also does not require excessive torque to be rotated by the film when the motor (or ratchet) is not activated. This acts as a safety feature which prevents tearing the film in case the projector should run continuously at too high a speed due to a misadjustment or component failure, or in case the signal to the synchronous motor (or ratchet) fails. The film will then simply run through the projector without damage, although of course, the synchronization would be lost until the proper adjustments or repairs are made.

In case the synchronous motor (or ratchet) used is not of this type, and is so difficult to rotate that the film would be damaged under the above conditions, a clutch may be installed between the synchronous motor (or ratchet) and the auxiliary sprocket. The clutch is adjusted so that it provides a positive drive under normal conditions, but slips when excessive tension develops in the film.

Instead of using the microswitch 8 shunting the resistor 9 to vary the speed of the projector motor, other means may also be used. For example, the arm 5 may be attached to the movable arm of a rheostat connected in series with the projector motor. The varying tension in the film would then vary the rheostat setting and hence the speed of the projector motor.

If absolute lip-synchronization is not required, the synchronous motor 12 may be driven by the 60 cycle line voltage rather than by a signal on the tape. The film speed will then be held in exact synchronization with the line voltage. Since most tape recorders run at a fairly constant speed, this provides a simple system for obtaining quite good (although not true lip-synchronous) synchronization. The tape and film are marked with "start marks" which are placed at the tape playback head and the film gate, respectively, or in some fixed relationship thereto. The tape recorder and the projector plus synchronous motor are started up simultaneously by the operator, and film and tape will run together with reasonably good synchronization.

Or, the synchronous motor (or ratchet) may be driven by pulses derived from a commutator which is rotated mechanically by the tape or tape recorder capstan. This method again does not provide perfect synchronization, since it does not account for tape slippage and/or changes in dimension due to temperature and humidity effects, etc.

Figure 4:
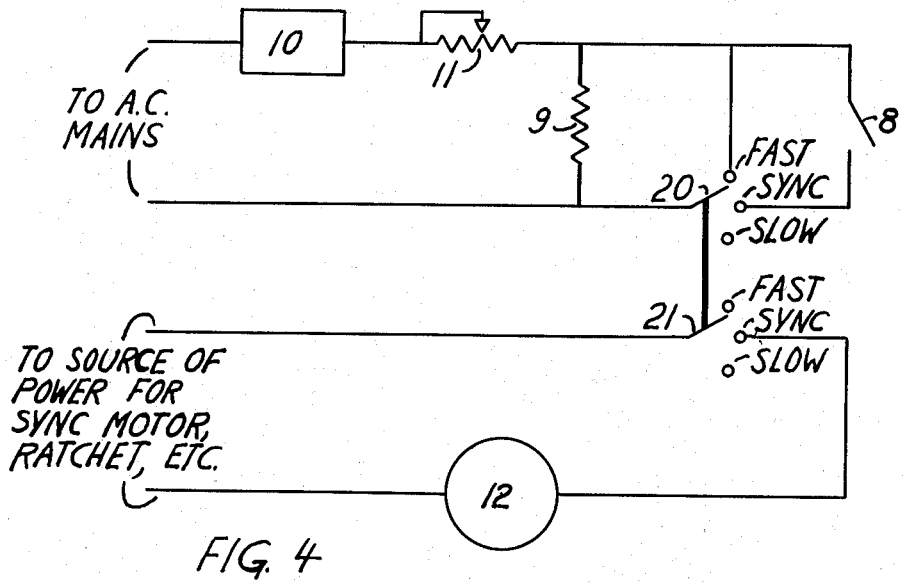
FIG. 4 is a circuit diagram showing a method for speeding up or slowing down a motion picture projector to restore synchronization between picture and sound.

It is desirable to include means for correcting the projector speed in case any errors in synchronization should develop after the film and tape have been running for a while. This is best accomplished by a three position momentary type switch, one position of which slows the projector down, another position of which speeds the projector up, and the third position of which provides synchronous operation. One method of connecting this switch into the circuit is shown in FIG. 4.

The switch shown 20, 21 is a three position, double-pole switch comprising one section 20 which controls the projector motor 10 and a second section 21 which controls the synchronous motor (or ratchet) 12. The synchronous motor (or ratchet) 12 may be driven from the tape, line, or any other source, this source being immaterial for the present discussion. When the switch 20, 21 is in the center or "sync" position, the projector is held in synchronization with the source of power driving the synchronous motor (or ratchet) 12 as previously described. When the switch is pushed to the upper or "fast" position, the power to the synchronous motor (or ratchet) 12 is cut off by the lower half of the switch 21, and simultaneously the resistor 9 is shorted out by the upper half of the switch 20. Shorting the resistor 9 causes the projector to run at a higher than synchronous speed. When synchronization has been restored, the switch is returned to the "sync" position, and the projector is again locked in synchronization with the source of power driving the synchronous motor (or ratchet) 12.

Similarly, when the switch is pushed to the lower or "slow" position, the lower half of the switch 21 again cuts off the power to the synchronous motor, while the upper half 20 open circuits the branch containing the microswitch 8, thereby permanently leaving the resistor 9 in series with the projector motor. Therefore, the projector runs at lower than synchronous speed. Again, when synchronization has been restored, the switch is returned to the center or "sync" position.

In case the system is used to project synchronous sound motion pictures at an average speed other than 16 frames per second, it may be desirable to insert some additional voltage in series with the projector motor so that the correct projector speed will be obtained. This may be done with a small filament type transformer, for example, having its secondary in series with the projector motor.

For the "constant speed" motors which are used in some projectors now on the market, there is little variation in speed with applied voltage. With these motors, it is essential that the projector normally run at a speed higher than the synchronous speed required. In some cases a change in the driving gear or drive wheel or belt ratio may be required to insure that this is the case.

The apparatus described above could be supplied in the form of an adapter which mounts on existing projectors, for example in place of the feed reel. (Provision would of course then be made for mounting the feed reel on the adapter.) Or the auxiliary sprocket, movable roller, etc., could be built into new or existing equipment as an integral part of the projector.

While I have described several embodiments of my invention, it is obvious that a number of variations are possible which do not depart from the true spirit and scope of the invention. For example, the auxiliary sprocket could be controlled by other electrical or mechanical means than those described, and could also be located in various other relationships to the projector drive mechanism besides the one described. Other methods could also be used to translate the variations in film tension into changes in projector speed. And, while the invention has been illustrated principally in connection with the projection of sound motion pictures, it is obvious that it may also be used in any application requiring regulation of the average speed of a motion picture projector.

What I claim is:

Apparatus for synchronizing a motion picture projector with a sound record comprising, means for driving the sound record past a transducing means, means for driving the projector, the last mentioned means comprising speed control means to move the motion picture film at a speed determined by signals transduced from the sound record by said transducing means, means for detecting the tension in a loop of film between said speed control means and projector for regulating the speed of the projector in relation to the speed of the speed control means, the just mentioned means including means for deenergizing the projector driving means in the absence of signals from the transducing means, the arrangement being such that synchronous movement of the sound record and the motion picture film may be started by starting the sound record whereupon signals therefrom start the projector.

References Cited in the file of this patent

UNITED STATES PATENTS

| | | |
|---|---|---|
| 2,099,987 | Murdock | Nov. 23, 1937 |
| 2,243,112 | Morrissey | May 27, 1941 |
| 2,279,119 | Freimann | Apr. 7, 1942 |
| 2,782,677 | Steigman | Feb. 26, 1957 |
| 2,932,235 | Ochiai | Apr. 12, 1960 |
| 2,937,565 | Otani | May 24, 1960 |

FOREIGN PATENTS

| | | |
|---|---|---|
| 347,026 | Great Britain | Apr. 23, 1931 |